Patented Aug. 1, 1944

2,354,788

UNITED STATES PATENT OFFICE 2,354,788

METHOD OF PRODUCING CALCIUM CARBONATE

Edward M. Allen, Copley, Ohio, assignor to Pittsburgh Plate Glass Company, Pittsburgh, Pa., a corporation of Pennsylvania No Drawing. Application May 4, 1942, Serial No. 441,709

5 Claims. (Cl. 23—66)

This invention relates to a methhod of producing calcium carbonate in a highly purified state. In accordance with my invention I have been able to prepare very pure grit free calcium carbonate by reacting calcium sulphate with an alkali metal carbonate such as sodium carbonate in an amount sufficient to precipitate the double salt sodium calcium carbonate and form an aqueous solution of sodium sulphate. This double salt may then be recovered and decomposed to form calcium carbonate and sodium carbonate and the sodium carbonate may be recycled in the process.

This process is particularly applicable to treatment of crude calcium sulphate such as crude gypsum or anhydrite which contains grit, and various other impurities such as silica, iron, magnesia, etc. It may be carried out by adding the gypsum, anhydrite or other calcium sulphate to a solution or aqueous suspension of sodium carbonate and agitating the mixture whereby a double salt such as may be generally represented by the formula $Na_2CO_3 \cdot CaCO_3 \cdot 2H_2O$ or $Na_2CO_3 \cdot CaCO_3 \cdot 5H_2O$ is precipitated. This double salt separates out in the form of relatively coarse and heavy, prismatic crystals which may be settled or otherwise removed from the solution or slurry while a substantial portion of the impurities remain dissolved or suspended as a slime of finely divided particles suspended in the aqueous slurry. For example, the coarser crystals of the double salt may be separated from the sludge or slime of impurities by suitable classification methods such as by filtration through a coarse filter of such porosity as to permit the fine impurities to pass through the filter without passage of the double salt. Other convenient methods of classifying materials of various sizes may be used and often the impurities may be removed by decantation since the double salt crystals settle and accumulate at the bottom of the container in which the slurry is disposed. Other suitable classification or elutriation methods may be similarly applied as will be understood by those skilled in the art.

The amount of sodium carbonate required for this process is capable of some variation but usually should be in excess of that theoretically required to react with the calcium sulphate and form the double salt. Preferably, sufficient excess sodium carbonate is present to ensure the presence of a solution containing 12 to 18 percent or more of $Na_2CO_3$ in the solution after precipitation of the double salt.

The slurry after removal of the double salt may be treated to recover the sodium sulphate therein. Thus, this liquor may be filtered and then treated to separate sodium sulphate by crystallization or other means and the sodium carbonate from which the sodium sulphate has been separated may be discarded or recycled for treatment of a further portion of calcium sulphate.

The resulting double salt, after removal from the slurry, may be treated to produce the individual carbonates or may be further purified. In some cases it is noted that the double salt is contaminated with heavy foreign particles of sand or grit. The double salt may be separated from these particles by various methods. In accordance with one suitable method it may be dispersed in an aqueous slurry containing sufficient alkali metal carbonate to prevent solution thereof and a gas such as air, oxygen, nitrogen, carbon dioxide, or other gas may be bubbled through the slurry. It is found that in such a case the double salt collects in the form of a froth at the top of the slurry and may be withdrawn, leaving the sand or grit behind. Flotation agents may be introduced to assist this action, if desired.

The sodium carbonate-calcium carbonate salt thus obtained may be washed with cold water or with an aqueous solution of an alkali metal carbonate such as sodium carbonate to effect a further purification if necessary. After the salt has been washed to the desired degree, the calcium carbonate may be obtained from the purified double salt by addition of water. Hot water is generally utilized since it tends to decompose the double salt with greater rapidity than cold water. The calcium carbonate thus formed is found to be very brilliant in color and in an exceptionally fine state of division. It may be used in dentifrices or as a pigment or filler in rubber, paint and paper composition or it may be applied to other uses.

The following example is illustrative:

777 grams of crude gypsum was added with 960 grams of solid sodium carbonate to 3000 grams of water and the mixture was agitated at room temperature for several hours. The sodium carbonate-calcium carbonate double salt precipitated as dense granular crystals which settled to the bottom of the cell. The sodium sulphate solution thus obtained containing finely divided suspended impurities was removed by decantation and the solution filtered. Thereafter, sodium sulphate was recovered in a very pure state by crystallization from the filtered solution.

The double salt crystals containing some heavy solid impurities were added to an aqueous solution containing 100 grams per liter of $Na_2CO_3$ and agitated with air whereby a froth which collected the double salt at the top of the slurry was formed. This froth was removed and the purified double salt was reacted with hot water, very pure white calcium carbonate being precipitated.

While the process has been described with particular reference to the use of sodium carbonate, with the consequent production of other alkali metal carbonate such as potassium or lithium carbonate may be used to form the corresponding double salt and the corresponding alkali metal sulphate.

Although the present invention has been described and claimed with particular reference to the specific details of certain embodiments thereof, it is not intended that such details shall be regarded as limitations upon the scope of the invention except insofar as included in the accompanying claims.

I claim:

1. A method which comprises reacting calcium sulphate with sufficient sodium carbonate in an aqueous medium to form a double salt of sodium and calcium carbonate, recovering the double salt, and decomposing it to form calcium carbonate.

2. A method which comprises reacting impure calcium sulphate in an aqueous medium with sufficient sodium carbonate to precipitate a double salt of sodium and calcium carbonate in the form of relatively coarse crystals, separating solid impurities from said double salt, and treating the double salt to form calcium carbonate.

3. A method which comprises reacting impure calcium sulphate in an aqueous medium with sufficient sodium carbonate to precipitate a double salt of sodium and calcium carbonate in the form of relatively coarse crystals, permitting the crystals to settle from the solution and removing the solution, together with a substantial quantity of finely divided impurities.

4. A method which comprises reacting impure calcium sulphate in an aqueous medium with sufficient sodium carbonate to precipitate a double salt of sodium and calcium carbonate in the form of relatively coarse crystals, permitting the crystals to settle from the solution and removing the solution together with a substantial quantity of finely divided impurities and treating the crystals to form calcium carbonate.

5. A method which comprises reacting impure calcium sulphate in an aqueous medium with sufficient alkali metal carbonate to precipitate a double salt of an alkali metal and calcium carbonate in the form of relatively coarse crystals, separating solid impurities from said double salt and treating the double salt to form calcium carbonate.

EDWARD M. ALLEN.